United States Patent [19]

Henderson et al.

[11] Patent Number: 5,695,881
[45] Date of Patent: Dec. 9, 1997

[54] COATED SOFT COPOLYMERS SUITABLE FOR BULK SHIPMENT AND STORAGE

[75] Inventors: Alex M. Henderson, Brampton; Miriam Stanisavljevic, Edmonton; D. Brian W. Yawney, Etobicoke, all of Canada

[73] Assignee: AT Plastics Inc., Hampton, Canada

[21] Appl. No.: 552,571

[22] Filed: Nov. 3, 1995

[51] Int. Cl.$^6$ ............................................. B32B 5/16
[52] U.S. Cl. ............................................. 428/403; 428/407
[58] Field of Search ........................................ 428/403, 407

[56] References Cited

U.S. PATENT DOCUMENTS

| | | | |
|---|---|---|---|
| Re. 32,325 | 1/1987 | Smith | 524/229 |
| 3,528,841 | 9/1970 | Donaldson et al. | 427/222 |
| 4,510,281 | 4/1985 | Smith | 524/229 |
| 4,643,960 | 2/1987 | Quan | 430/106.6 |
| 4,880,470 | 11/1989 | Hyche et al. | 106/271 |
| 4,898,616 | 2/1990 | Hyche et al. | 106/271 |
| 4,960,644 | 10/1990 | Hyche et al. | 428/407 |
| 4,975,120 | 12/1990 | Hyche et al. | 106/271 |
| 5,007,961 | 4/1991 | Hyche et al. | 106/18 |
| 5,096,493 | 3/1992 | Hyche et al. | 106/271 |
| 5,190,579 | 3/1993 | Gose et al. | 106/18 |
| 5,494,768 | 2/1996 | Bowell et al. | 430/406.6 |

FOREIGN PATENT DOCUMENTS

| | | |
|---|---|---|
| 0410914A1 | 7/1990 | European Pat. Off. . |
| 3318454A1 | 11/1984 | Germany . |

*Primary Examiner*—H. Thi Le
*Attorney, Agent, or Firm*—Cushman Darby & Cushman IP Group Pillsbury Madison & Sutro LLP

[57] ABSTRACT

Soft copolymer compositions in pellet form comprise said polymer pellets coated with a wax-based emulsion of N,N'-ethylenebisoleamide. The coated pellet has antiblock characteristics which allow bulk shipment and storage of soft polymers without the pellets agglomerating into an unmanageable mass. Less N,N'-ethylenebisoleamide is required to provide equivalent antiblock characteristics as compared to soft copolymer compounds in pellet from containing N,N'-ethylenebisoleamide throughout the pellet.

11 Claims, No Drawings

COATED SOFT COPOLYMERS SUITABLE FOR BULK SHIPMENT AND STORAGE

FIELD OF INVENTION

This invention relates to coated soft copolymer pellets, for example coated ethylene-vinyl acetate (EVA) copolymer pellets, which have improved resistance to agglomeration to such a degree as to allow favourable bulk shipment and storage of the coated polymer pellets.

BACKGROUND OF THE INVENTION

Ethylene-vinyl acetate (EVA) copolymers find wide commercial application and are produced with vinyl acetate content of the polymer ranging from 2–45 weight % and melt index (MI), a measure of viscosity, ranging from <1 to >2000 g/10 min as measured by ASTM D1238 Cond.E. The higher the melt index, the lower the viscosity.

In particular, EVA copolymers used in hot melt adhesive applications typically have % VA >18% and MI >50 g/10 min. As the % VA and MI of the EVA increase, the pellets become softer, tackier, and more prone to agglomeration under their own weight. This inhibits handling of the polymer pellets. For example, EVA pellets having a 40% VA content and a 55 MI, agglomerate into an unmanageable mass in a 25 kg bag and, accordingly, prior to use must be forcibly re-dispersed to enable the pellets to flow. Most, if not all, applications of EVA copolymers require free flowing pellets for feeding into equipment or convenient blending with other components. Large agglomerations of pellets disrupt operations. In particular, EVA of 28% VA and 400 MI cannot be shipped in bulk in hopper cars because of the risk of the pellets agglomerating into a huge mass which will not readily flow out of the hopper car. Inconvenient poking, scraping and digging the pellets out of the hopper car by manual means is required which is an expensive and very slow process.

At a temperature of about 95° F., for gravity flow (P-Factor=1=Applied Pressure/Gravity) and effective head (EH) of 10 feet, which is similar to the height of a pellet bed in a full hopper car, the critical ratholing dimension (DF) of a 28% VA, 5 MI EVA is 2.9 feet after a 72 hr storage period. For a 28% VA, 400 MI EVA, it is 10 feet after 39 hr storage and for a 40% VA, 55 MI EVA, it is 44 feet after 36 hr storage. Clearly, the latter two compositions and conditions are too unfavourable for bulk shipment in a hopper car wherein the pellet bed height can reach 12 feet when completely full. Further, storage is often longer than 36 hours and the P-Factor may actually be greater than 1 due to vibration settling during shipment.

The tendency of polymer pellets to agglomerate can be measured using a compaction cell. In this simulation test, polymer pellets are subjected to the pressure they would be subjected to in a hopper car, as determined by the height of the load and its bulk density. This is done at an elevated temperature in an oven, such as 35° C., to simulate, for example, Texas in the summertime. The load is then removed and the force required to move a cone-shaped through the polymer bed is measured.

Various techniques have been proposed to prevent EVA pellet agglomeration, including coating the pellets with various materials e.g. U.S. Pat. No. 3,528,841 Donaldson et al, issued Sep. 15, 1970, and EPA 0410 914 A1—McCloskey et al, published Jan. 30, 1991. The addition of slip additives N,N'-ethylenebisamides and N,N'-diadipamides in certain concentrations have been claimed to prevent EVA pellet agglomeration, e.g. U.S. Pat. No. Re. 32,325,—Smith issued Jan. 6, 1987. The incorporation of additives throughout the composition is claimed to be superior to coated pellets in that the latter are alleged to lose their coating during handling and pellet agglomeration prior to application of the coating. German Patent Disclosure 3318454 A1,—Brandstetter et al, published Nov. 22, 1984, discloses contacting polyethylene polymers and copolymers extrudate with cooling water containing a release agent that is insoluble in both water and the polymer and is liquid below 60° C. A series of patents assigned to Hyche et al, namely, U.S. Pat. Nos. 4,880,470, 4,898,616, 4,975,120, 4,960,644, 5,007,961, 5,096,493 and 5,190,579 describe the application of additives to polymer pellets by incorporation of the additive into wax emulsions of the type used to coat citrus fruit and to subsequently coat the polymer pellets with the emulsion. These wax emulsions containing additives are available from Eastman Chemical Co. under the trademark AQUASTAB®.

In order to reduce the degree of agglomeration of soft polymers during transportation and storage, it is common practice to use insulated hopper cars to facilitate unloading of the soft Polymer pellets from the cars because the pellets are less soft and tacky at cooler temperatures than at ambient temperature. Accordingly, there is a need to provide an economic means of transporting and storing soft polymers under relatively high ambient temperatures without unfavourable degrees of agglomeration occurring.

SUMMARY OF THE INVENTION

It is an object of the present invention to provide soft polymers having a surface coating which reduces the degree of agglomeration of the pellets under typical transportation and storage conditions encountered in this industrial art.

Accordingly, in its broadest aspect the invention provides a particulate material having improved anti-blocking properties suitable for long-term storage under reactively high ambient temperature, said material comprising a soft-polymer being substantially free of anti-blocking agent but having a surface coating of N,N'-ethylenebisoleamide.

The N,N'-ethylenebisoleamide is present, preferably, in a wax-based emulsion, and more preferably AQUASTAB® emulsion.

The amount of coating additive is preferably at a concentration greater than 1500 ppm by weight of the total polymer weight, and more preferably at 1500–4500 ppm.

The invention is of value to particulate material such as pellets of a size, typically from 2 mm diameter to 5 mm diameter spheres or long dimension of ovals or length of rods; powder of typically less than 35 mesh; and granules/flakes of irregular or regular shapes with dimensions intermediate of those above.

In this specification and claims a "soft copolymer" is defined as one which at 95° F., for gravity flow (P-Factor=1=applied Pressure/Gravity) and effective head (EH) of 10 feet has a critical ratholing dimension (DF) greater than 2.9 feet. A "rathole" is a no-flow condition in which the material forms a stable vertical hole within the bin. The "critical ratholing dimension" is the diameter above which a stable rathole will not form.

Surprisingly, we have discovered that the agglomeration of soft copolymers, particularly EVA copolymers and more particularly EVA with VA >18% and MI >50, can be minimized and the flow properties of the pellets improved enough to allow bulk shipment in regular insulated cars with effective head <10 feet and P-Factor ≦1, so that the hopper cars can be unloaded using normal bulk loading equipment by coating pellets with a wax emulsion containing N,N'-ethylenebisoleamide and equivalent performance can be achieved using less N,N'-ethylenebisoleamide than when the N,N'-ethylenebisoleamide is present in admixture within the pellets.

We have, surprisingly, found that significantly lower wt % amounts of N,N'-ethylenebisoleamide to the total weight of polymer compound than in prior art admixed soft polymer compositions are needed in the present invention.

While not being bound by theory, we believe that less N,N'-ethylenebisoleamide is needed as a surface mating according to the invention to provide equivalent effectiveness because the effectiveness of this additive as a slip or antiblock additive is possibly due to its low solubility in polylefinic materials. When the N,N'-ethylenebisoleamide is added in admixture to the polymer, most of the additive eventually migrates to the pellet surface imparting a slippery surface to the pellet. The actual equilibrium concentration of the N,N'-ethylenebisoleamide in the polymer is low. Therefore, when the N,N'-ethylenebisoleamide is applied to the pellet as a coating most of it remains on the surface, only a low level migrates into the polymer. When the EVA polymer in the form of pellets is produced from molten polymer the pellet bed contains significant amounts of latent heat, which takes several hours to cool. Such pellets are often packaged while warm. Accordingly, in the practice of the present invention, the tendency of the polymers to agglomerate is reduced by having a relatively high or local concentration of N,N'-ethylenebisoleamide immediately placed on their surfaces, when it matters, rather than the pelleted system having to wait for diffusion of the additive out of the polymer matrix. Thus, the present invention provides for increased efficacy of the N,N'-ethylenebisoleamide as an additive.

DESCRIPTION OF PREFERRED EMBODIMENTS OF THE INVENTION

In order that the invention may be better understood, preferred embodiments will now be described by way of example only.

In this specification and claims, the amount of N,N'-ethylenebisoleamide applied as a surface coating is the weight of additive applied to total polymer weight.

EXAMPLE 1

Erucamide and N,N'-ethylenebisoleamide were each incorporated into an AQUASTAB® Additive wax emulsion (Eastman Chemical Co.) similar to those used to coat citrus fruits. Pellets of a 28% VA, 400 MI EVA Copolymer (AT 2842M—At Plastics Inc., Brampton, Ontario, Canada) were coated with individually aforesaid emulsions to provide, approximately, 1500 ppm or 3000 ppm of the additive on the surface of pellets. AQUASTAB additives delivery system (Eastman) is dispersed polymer additives in an aqueous emulsion of low molecular weight oxidized polyolefin wax. Commonly available polymer additives used in the manufacture of all types of polymers can be incorporated into an AQUASTAB additives delivery system. AQUASTAB can be applied to polymer pellets, granules, or powder.

1 kg of the coated and control uncoated pellets were loaded into compaction cells (3½" diameter, 12" tall) and a 8 kg weight placed on the pellets. This arrangement represents an approximately 2 psi load and simulates an effective head on 10 feet of pellets having a bulk of density of 625 kg/m³ in a hopper car. As a comparison, a commercially available 28% VA, 400 MI EVA copolymer (Elvax 210W), having approximately 4500 ppm N,N'-ethylenebisoleamide admixture as described in U.S. Pat. No. Re. 32,325 was used. The loaded compaction cells were stored in a 35° C. oven for 24 hr. The degree of blocking was manually evaluated by the number of probes with the hand required to reach through the pellet bed to the bottom of the cell. The results are given in Table I.

TABLE I

Agglomeration of EVA Copolymer
(1 day Storage @ 35° C., 8 kg load, 3½" diameter cell)

| Sample | Additive | # Hand Probes |
|---|---|---|
| Elvax 210W | 4500 ppm, N,N'-ethylenebisoleamide | 3 |
| AT 2842M coated | none | 5 |
| AT 2842M coated | 2700 ppm N,N'-ethylenebisoleamide as coating | 3 |
| AT 2842M coated | 2400 ppm erucamide as coating | 5 |
| AT 2842M coated | 1700 ppm, N,N'-ethylenebisoleamide as coating | 3 |
| AT 2842M coated | 1200 ppm erucamide as coating | 5 |

The results show that erucamide was not as effective in reducing pellet agglomeration. The N,N'-ethylenebisoleamide coated onto the pellets at approximately 1700–2700 ppm was as effective as the pellets containing 4500 ppm N,N'-ethylenebisoleamide.

EXAMPLE 2

In a modified compaction cell comparison test, a 9 cm diameter compaction cell was provided with a cone-shaped steel member at a lower end thereof and the cell fried with 28% VA, 400 MI EVA copolymer pellets as set forth in Table II. An 8 kg compaction load was applied to the pellets by means of a stand-off and the pellets stored at 35° C. for 3½ days under this 8 kg load. The force required to pull the cone through the pellets was measured with an Instron Tensile Tester. The results are shown in Table II.

TABLE II

28% VA, 400MI EVA Copolymer

| Sample | Additive | Minimum Force to move Cone |
|---|---|---|
| Elvax 210W | 4500 ppm, N,N'-ethylenebisoleamide in admixture with polymer | 200 Nt |
| AT 2842M coated | 3200 ppm N,N'-ethylenebisoleamide as coating | 250 Nt |
| AT 2842M coated | 2500 ppm erucamide as coating | 340 Nt |
| AT 2842M | none | 390 Nt |
| AT 2842M modified | 2500 ppm erucamide in polymer | 390 Nt |

Table II shows that pellets coated with N,N'-ethylenebisoleamide exhibited less agglomeration than the uncoated pellets or pellets containing erucamide in admixture throughout the polymer, and similar to pellets containing higher levels of N,N'-ethylenebisoleamide in admixture with the polymer. The pellets coated with N,N'-ethylenebisoleamide broke apart very easily in a manner similar to the pellets containing admixed N,N'-ethylenebisoleamide in the polymer.

EXAMPLE 3

As described hereinabove, the critical rathole dimension, (DF), for a 40% VA and 30 MI EVA is a relatively high 12 m. after only 36 hours at 95° F. This reflects a soft, tacky, rubbery nature of the polymer and offers a sever test of anti-agglomeration measures. Test results of the agglomeration of 40% VA, 55 MI EVA's under a 8 kg load for 24 hr at 35° C. as for Example 2 at a 5 cm/minute cone cross head speed in a 9 cm compaction cell are given TABLE III.

TABLE III

| Sample | Additive | Minimum Force to move Cone |
|---|---|---|
| Elvax 40W | 4700 ppm, N,N'-ethylenebisoleamide in polymer | 270 Nt |
| AT 4030MC | 4000 ppm N,N'-ethylenebisoleamide as coating | 270 Nt |
| AT 4030MC | 4100 ppm N,N'-ethylenebisoleamide as coating | 320 Nt |
| AT 4030M | none | >530 Nt (disbonded) |

The results of Table III show that the EVA without any additive agglomerated into a single large mass. The minimum force measured in this test was not that of the cone moving through the pellet bed but rather the whole mass detaching from the walls of the compaction cell and being carried up with the cone.

The pellets coated with N,N'-ethylenebisoleamide exhibited the same agglomeration as pellets containing higher levels of N,N'-ethylnebisoleamide. The pellets coated with N,N'-ethylenebisoleamide broke apart very easily in a manner similar to the pellets containing N,N'-ethylenebisoleamide.

EXAMPLE 4

This example illustrates an industrial application of the practice of the present invention. A first hopper car compartment was loaded with 16 metric tons of AT 2842MC (28% VA, 400 MI EVA copolymer) having a 3200 ppm N,N'-ethylenebisoleamide coating on the pellets. A second hopper car compartment was loaded with 16 metric tons of AT 2842MC with 2500 ppm N,N'-ethylenebisoleamide coated on the pellets. The hopper car was shipped from Edmonton, Alberta, Canada to a location near Dallas, Tex. where ambient temperatures reached above 30° C. during the day. Four months later, the hopper car components were transferred into a silo. The unloading transfer rate and conditions for AT 2842MC were equivalent to that of a competitive EVA material, Elvax 210W, which, typically, has over 4000 ppm N,N'-ethylenebisoleamide in admixture in polymer, while being superior to another competitive material, UE653-67, which, typically, has 3000 ppm erucamide within the polymer. Most surprisingly, only a thin coating of AT 2842MC polymer pellets was left on the sides of the hopper car. The hopper car in this test was not insulated. This is unlike common industrial practice which requires use of an insulated car. Such use of an insulated car would be expected to improve ease of unloading of pellets according to the invention even further.

Thus, it is seen that the present invention readily achieves the ends and advantages mentioned as well as those inherent therein. While certain preferred embodiments of the invention have been illustrated and described for purposes of the present disclosure, numerous changes in the components and compositions thereof may be made by those skilled in the art, which changes are encompassed within the scope and spirit of the present invention as defined by the appended claims.

We claim:

1. A particulate material having improved anti-blocking properties suitable for long-term storage under reactively high ambient temperature, said material comprising a soft copolymer which is substantially free of anti-blocking agent within the polymer and has only a surface coating of N,N'-ethylenebisoleamide as the sole essential means for improving the anti-blocking properties.

2. A particulate material as defined in claim 1 wherein said surface coating comprises said N,N'-ethylenebisoleamide in a wax-based emulsion.

3. A particulate material as claimed in claim 2 wherein said surface coating comprises said N,N'-ethylenebisoleamide in AQUASTAB® wax-based emulsion.

4. A particulate material as defined in claim 1 wherein said soft polymer is an ethylene-vinyl acetate copolymer.

5. A particulate material as defined in claim 4 wherein said ethylene-vinyl acetate copolymer has a vinyl acetate content of 18%–40% and a melt index greater than 50 g/10 min.

6. A particulate material as defined in claim 5 wherein said ethylene-vinyl acetate copolymer has a vinyl acetate content of 28%–40% and a melt index of greater than about 400 g/10 min.

7. A particulate material as defined in claim 5 wherein said ethylene-vinyl acetate copolymer has a vinyl acetate content of 40% and a melt index of greater than about 55 g/10 min.

8. A particulate material as defined in claim 1 wherein said N,N'-ethylenebisoleamide is at a concentration of at least 1500 ppm by weight of the total polymer weight.

9. A particulate material as defined in claim 8 wherein said N,N'-ethylenebisoleamide is at a concentration of 1500–4500 ppm by weight of the total polymer weight.

10. A particulate material as claimed in claim 1 in the form selected from a pellet, granule and powder.

11. A particulate material as claimed in claim 1 in the form of a pellet.

* * * * *